US009580061B2

(12) United States Patent
Pipho et al.

(10) Patent No.: US 9,580,061 B2
(45) Date of Patent: Feb. 28, 2017

(54) COMBINED ENGINE AND HYBRID POWER SYSTEM LOAD CONTROL

(71) Applicant: Deere & Company, Moline, IL (US)

(72) Inventors: Michael J. Pipho, Dunkerton, IA (US); Thomas M. Johnson, Cedar Falls, IA (US); Christopher D. Turner, Waterloo, IA (US)

(73) Assignee: Deere & Company, Moline, IL (US)

( * ) Notice: Subject to any disclaimer, the term of this patent is extended or adjusted under 35 U.S.C. 154(b) by 90 days.

(21) Appl. No.: 14/615,805

(22) Filed: Feb. 6, 2015

(65) Prior Publication Data
US 2016/0229388 A1 Aug. 11, 2016

(51) Int. Cl.
*B60W 10/10* (2012.01)
*B60W 10/06* (2006.01)
(Continued)

(52) U.S. Cl.
CPC ............ *B60W 10/10* (2013.01); *B60W 10/06* (2013.01); *B60W 10/08* (2013.01); *B60W 10/196* (2013.01); *B60W 10/26* (2013.01); *B60W 20/106* (2013.01); *B60W 20/11* (2016.01); *E02F 9/2075* (2013.01); *E02F 9/2079* (2013.01); *B60K 6/48* (2013.01);
(Continued)

(58) Field of Classification Search
None
See application file for complete search history.

(56) References Cited

U.S. PATENT DOCUMENTS 6,847,189 B2    1/2005    Frank
7,076,356 B2    7/2006    Hubbard
(Continued)

FOREIGN PATENT DOCUMENTS

CH              706518 A1       11/2013
DE         102007055821 A1       6/2009
(Continued)

OTHER PUBLICATIONS

Study on Serious Hybrid Electric Vehicle Control System Based on MPC566 Microcontroller, Advanced Technology in Teaching—Proceedings of the 2009 3rd International Conference on Teaching and Computational Science (WTCS 2009).
(Continued)

*Primary Examiner* — Thomas Tarcza
*Assistant Examiner* — Garrett Evans
(74) *Attorney, Agent, or Firm* — Lorenz & Kopf, LLP

(57) ABSTRACT

A work vehicle including an engine, configured to supply power for driving a ground engaging traction device, and a hybrid power system to drive a powertrain. An engine controller is operatively coupled to the engine and is configured to generate a hybrid torque command received by a hybrid powertrain controller operatively coupled to the engine controller. The hybrid powertrain controller is configured to generate an available hybrid torque signal and a desired hybrid torque signal both of which are configured to be received by the engine controller. The engine controller generates an engine command signal configured to command the engine to operate at a commanded engine torque, in response to the available hybrid torque signal and the desired hybrid torque signal.

19 Claims, 7 Drawing Sheets

(51) Int. Cl.
*B60W 10/08* (2006.01)
*B60W 10/196* (2012.01)
*B60W 10/26* (2006.01)
*B60W 20/00* (2016.01)
*E02F 9/20* (2006.01)
*B60W 50/00* (2006.01)
*B60K 6/48* (2007.10)

(52) U.S. Cl.
CPC ............ *B60W 2050/0006* (2013.01); *B60W 2050/0011* (2013.01); *B60W 2050/0026* (2013.01); *B60W 2300/17* (2013.01); *B60W 2510/0638* (2013.01); *B60W 2510/246* (2013.01); *B60W 2710/0666* (2013.01); *B60W 2710/083* (2013.01); *B60W 2710/105* (2013.01); *B60W 2710/244* (2013.01); *Y02T 10/6286* (2013.01); *Y10S 903/93* (2013.01)

(56) References Cited

U.S. PATENT DOCUMENTS

| | | | |
|---|---|---|---|
| 7,206,689 B1 | 4/2007 | Johnson | |
| 8,225,608 B2 | 7/2012 | Wu et al. | |
| 8,323,144 B1 | 12/2012 | Bin et al. | |
| 8,776,929 B2 | 7/2014 | West et al. | |
| 2009/0012665 A1* | 1/2009 | Brennan | B60L 1/003 701/22 |
| 2009/0088944 A1* | 4/2009 | Aswani | B60K 6/387 701/103 |
| 2012/0109441 A1* | 5/2012 | Vespasien | B60L 7/18 701/22 |
| 2012/0158225 A1* | 6/2012 | Books | B60W 50/00 701/22 |
| 2013/0047753 A1 | 2/2013 | Husson et al. | |
| 2015/0105947 A1* | 4/2015 | Chang | B60L 11/1861 701/22 |

FOREIGN PATENT DOCUMENTS

| | | |
|---|---|---|
| DE | 102008042132 A1 | 3/2010 |
| DE | 102009054466 A1 | 6/2011 |
| DE | 102010014971 A1 | 10/2011 |

OTHER PUBLICATIONS

European Patent Office, European Search Report in Application No. EP 16 15 4401, dated Jun. 27, 2016.

* cited by examiner

COMBINED ENGINE AND HYBRID POWER SYSTEM LOAD CONTROL

FIELD OF THE DISCLOSURE

The present invention generally relates to a control system for a vehicle having hybrid power system, and more particularly to a work vehicle having a prime mover to provide power and a shaft power conversion machine with energy storage to provide power and regenerative braking.

BACKGROUND

Agricultural equipment, such as four wheel drive loader, a tractor or a self-propelled combine-harvester, includes a prime mover which generates power to perform work, a shaft power conversion machine, and reversible energy storage. In the case of a four wheel drive loader, for instance, the prime mover is often a diesel engine that generates power from a supply of diesel fuel. The diesel engine drives a transmission which moves a ground engaging traction device, such as wheels or treads, to propel the loader, in some situation, across unimproved ground for use in construction. Such loaders include a hydraulic machine having a hydraulic pump which can be used for instance, to raise or lower a piece of equipment such as a bucket.

In the case of a tractor, the prime mover is often a diesel engine that drives a transmission which moves wheels or treads to propel the tractor across a field. In addition to providing power to wheels through a transmission, tractors often include a power takeoff (PTO) which includes a shaft coupled to the transmission and driven by the engine. The power takeoff can be used to drive a variety of work implements or accessories including pumps, plows, and harvesters.

Other work vehicles having prime movers include construction vehicles, forestry vehicles, lawn maintenance vehicles, as well as on-road vehicles such as those used to plow snow, spread salt, or vehicles with towing capability. While each of the work vehicles, including the work equipment described above, often include combustion engines as the prime mover, some vehicles have what is known as a hybrid power system. A hybrid power system integrates one or more reversible energy storage device(s) and one or more machines to convert power between the energy storage device(s) and one or more rotating shafts.

Generally, the hybrid power system delivers power and absorbs power using a reversible shaft power conversion machine. Examples of reversible shaft power conversion machines are electric motor/generator and hydraulic motors/pumps. The reversible shaft power conversion machine is configured to receive power from the hybrid energy storage device(s) and provide shaft power to assist a powertrain, and to receive power from the powertrain, such as from regenerative braking, for delivery into the hybrid energy storage device(s) When using a hybrid power system, it is still necessary to provide speed control or overall torque control, while simultaneously keeping the energy storage device within a desired stored energy level. While separate control governors can be used, one for the diesel engine which limits engine speed, and one for the reversible shaft power conversion machine, limiting motor speed, separate control governors can lead to difficulty with smooth torque control when one of the engine and hybrid power system reaches a maximum limit. In addition, optimization of the overall system is difficult. What is needed, therefore, is a control system having combined control for both the engine and the reversible shaft power conversion machine.

SUMMARY

In one embodiment of the disclosure, there is provided a control system for a work vehicle hybrid power system to drive a powertrain, wherein the hybrid power system includes an internal combustion engine, a reversible shaft power conversion machine, and a reversible energy storage device. The control system includes an engine controller, operatively coupled to the engine and configured to generate a bi-directional torque command signal indicative of the amount of bi-directional torque to be generated or absorbed by the reversible shaft power conversion machine, and a hybrid powertrain controller. The hybrid powertrain controller is operatively coupled to the engine controller and to the powertrain to control the reversible shaft power conversion machine and manage an energy storage level of the energy storage device. The hybrid powertrain controller is configured to generate an available torque signal and to generate a desired torque signal, both of which are received by the engine controller, wherein the engine controller generates an engine command signal configured to command the engine to operate at a commanded engine torque in response to the available torque signal and the desired torque signal from the hybrid powertrain controller.

In another embodiment of the disclosure, there is provided a method of controlling an amount of torque being generated by an engine of a hybrid work vehicle including a reversible shaft power conversion machine, an energy storage device, a powertrain, and a powertrain speed governor. The method includes: (i) determining a power train speed governor desired torque; (ii) determining a desired torque to be provided by the reversible shaft power conversion machine; and (iii) generating a commanded torque signal as a function of (a) the powertrain speed governor desired torque, (b) the desired torque, (c) a minimum torque available from one of the reversible shaft power conversion machine and the energy storage device, and (d) a maximum torque available from one of the reversible shaft power conversion machine and the energy storage device.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
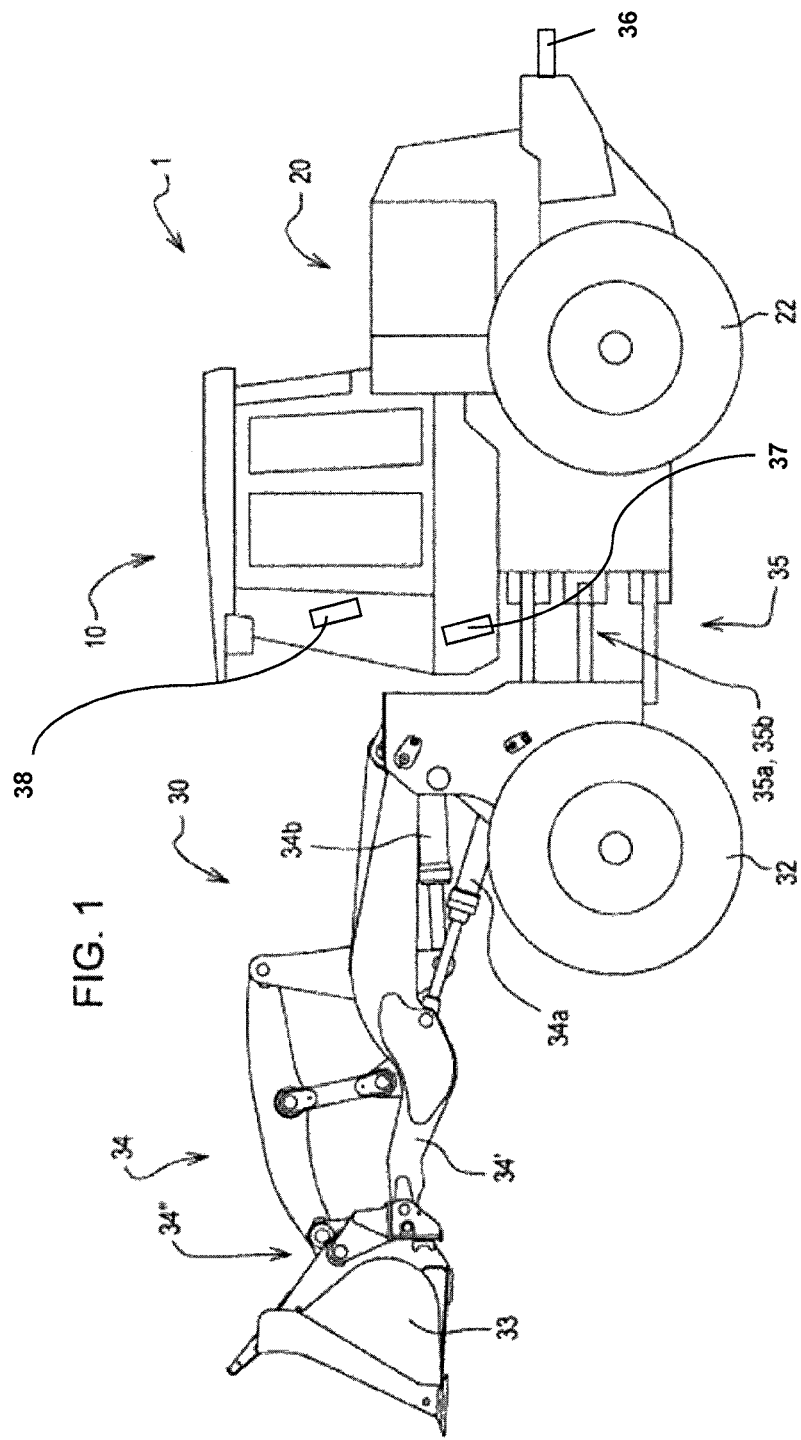
FIG. 1 is a side elevational view of work vehicle utilizing the invention.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

FIG. 1 is a side elevational view of a work vehicle 1. The work vehicle 1 is a four wheel drive (4WD) loader having: a cab 10; a rear body portion 20 with rear wheels 22; a front body portion 30 with front wheels 32, a bucket 33, a linkage 34 for working the bucket 33, and hydraulic cylinders 34a and 34b to power the linkage 34. An articulation joint 35 enables angular change between the front body portion 30 and the rear body portion 20. Hydraulic cylinders 35a, 35b enable angular changes between the front and rear body portions 20, 30 under hydraulic power derived from conventional hydraulic pumps (not shown). The loader 1 further includes, in different embodiments, a power takeoff (PTO) 36.

An accelerator pedal 37 and a user interface 38 are located within the cab for use by an operator of the vehicle 1. The accelerator pedal 37 enables the operator to adjust the speed of the vehicle. In other embodiments, a hand lever provides this function.

The user interface 38 includes a plurality of operator selectable buttons configured to enable the operator to control the operation and function of the vehicle 1 and any accessories or implements being driven by the powertrain of the vehicle, including the PTO 36. The user interface 38, in one embodiment, includes a user interface screen having a plurality of user selectable buttons to select from a plurality of commands or menus, each of which are selectable through a touch screen having a display. In another embodiment, the user interface includes a plurality of mechanical push buttons as well as a touch screen. In another embodiment, the user interface includes a display screen and only mechanical push buttons.

The operator of the vehicle 1 determines a setpoint for speed of the vehicle from the accelerator pedal 37, the user interface 38, or other user controls as is known by those skilled in the art. A closed loop speed controller (not shown), coupled to one or both of the accelerator pedal 37 and user interface 38 adjusts the output torque of the vehicle engine depending on the setpoint established by the operator. For instance, the output torque is adjusted by the controller to be a higher torque if the speed is lower than the setpoint and is adjusted to be a lower torque if the engine speed is higher than the setpoint, to thereby maintain the speed of the system at the desired setpoint. In one embodiment, the speed controller controls uses a PID (proportional/integral/derivative) control algorithm, as is known by those skilled in the art. So for instance, if the vehicle powertrain is pulling a heavy load, the powertrain speed governor torque will be higher than if the unit is pulling a light load.

Figure 2:
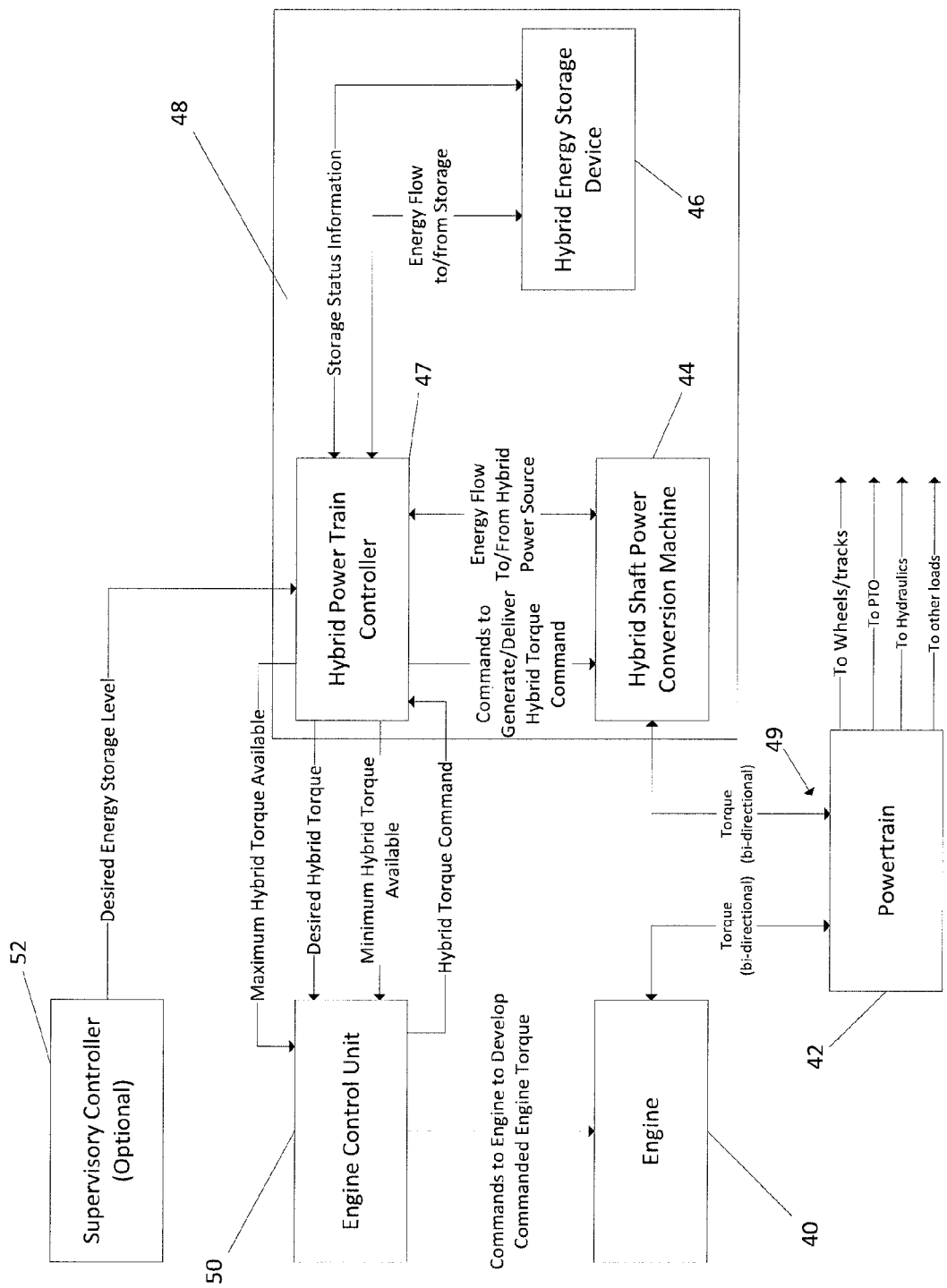
FIG. 2 is a block diagram of a control system embodying the invention.

As illustrated in FIG. 2, the vehicle 1 includes an engine 40, also known as a prime mover, which in different embodiments is a gasoline powered or diesel powered engine. The engine 40 is connected to and drives a powertrain 42, which includes either a manual transmission or an automatic transmission, as is known by those skilled in the art. The engine 40 provides torque to or absorbs torque from the powertrain 42, which in turn is used to drive the wheels 22 and 32 as illustrated in FIG. 1. In addition, the powertrain 42 is also used to drive the PTO 36, the hydraulics, and other loads as it is known by those skilled in the art. The hybrid vehicle 1 further includes a hybrid shaft power conversion machine 44 which is coupled to a hybrid energy storage device 46, which includes one or more batteries or energy storage cells. The hybrid shaft power conversion machine 44 is also described herein as a reversible shaft power conversion machine. In one embodiment, the hybrid shaft power conversion machine 44 is a single machine having combined features configured to reversibly drive a shaft of a powertrain and to receive a torque input form the shaft of the powertrain. In other embodiments, the hybrid power conversion machine is not a reversible machine, but instead includes two or more individual machines. For instance, one machine is configured to convert shaft power into a power form to be stored in the hybrid energy storage device, and another machine is configured to convert power stored in the hybrid energy storage device into shaft power.

The hybrid energy storage device 46 is configured to store energy generated by the hybrid shaft power conversion machine 44 and to provide the stored energy to the hybrid shaft power conversion machine 44 when needed to drive the powertrain 42. In addition, storage status information is provided by the hybrid energy storage device 46 to the hybrid power train controller 47 where the status information is used to determine the rate limits of energy flow to or from the hybrid energy storage device 46 with the hybrid power train controller 47.

The shaft power conversion machine 44, the hybrid energy storage device 46, and a hybrid powertrain controller 47 are generally known as the hybrid power system 48, which is used in the hybrid vehicle 1 to provide the torque required by the powertrain 42 under certain conditions. The torque provided by the hybrid power system 48 includes and is controlled by the hybrid powertrain controller 47. The hybrid powertrain controller 47 is operatively connected to the hybrid shaft power conversion machine 44 through a communications link, as is understood by those skilled in the art. The hybrid powertrain controller 47 is configured to provide command signals to the hybrid shaft power conversion machine 44 including a hybrid torque command signal and an energy flow signal, which control the operation of the hybrid shaft power conversion machine 44 to either deliver torque to the powertrain 42 or to receive torque provided by the powertrain 42. Torque provided by the powertrain 42 to the hybrid shaft power conversion machine 44 is converted by the hybrid shaft power conversion machine 44 to a current which is converted and stored as energy by the hybrid energy storage device 46. Energy flow between the hybrid shaft power conversion machine 44 and the hybrid energy storage device 46 is controlled by the hybrid power train controller 47. The torque delivered to or supplied by the powertrain 42 is located at a powertrain input/output (I/O) 49. The speed controller (not shown) is operatively connected to the engine control unit 50 to provide a powertrain speed governor torque based on a speed setpoint which is provided by either the operator or a vehicle controller. The engine controller 50 is also described herein as an engine control unit. The engine controller 50, in different embodiments, includes a standard speed governor or other engine controllers which provide standard engine control functions.

The hybrid powertrain controller 47 is operatively connected to the engine control unit 50. The engine control unit 50 communicates with the hybrid powertrain controller 47 through a communications link, such as that provided for communication between the powertrain controller 47 and the hybrid shaft power conversion machine 44. The communication links, in different embodiments include hardwired links as well as wireless communication links such as Bluetooth. The engine controller 50 is also operatively coupled to the engine 40 to provide command signals to the engine 40 which delivers the commanded torque. The hybrid powertrain controller 47 is configured to control the amount of torque the hybrid power system 48 generates or receives. When received, the generator/motor generates electric energy for storage in the hybrid energy storage device 46.

The commanded torque signals provided to the engine 40 are developed through a combined control provided by the powertrain controller 47 and the engine controller 50 operating in concert as a combined system/engine control system to provide a preferred torque to the powertrain 42. The preferred torque is provided by one of or both of the engine 40 and the hybrid shaft power conversion machine 44 depending on the calculated preferred torque.

Each of the powertrain controller 47 and the engine controller 50, in different embodiments, includes one or more processors (e.g. microprocessors), and the associated internal memory including random access memory (RAM) devices comprising the memory storage for each of the controllers 47 and 50, as well as any supplemental levels of memory, e.g., cache memories, non-volatile or backup memories (e.g. programmable or flash memories), read-only memories, etc.

The engine control unit 50 receives the information in the form of electrical signals from the hybrid powertrain controller 47. The engine control unit 50 receives: 1) a maximum hybrid torque available from the hybrid power system 48 which is capable of being generated at the present moment; 2) a minimum hybrid torque available from the hybrid power system 48 which is capable of being generated at the present moment; and 3) the desired torque the hybrid powertrain controller 47 would like to have the hybrid power system 48 generate at the present moment. Any one, some of, or all of the torque commands includes a positive command (generate torque for the vehicle using energy from the hybrid energy storage device 46 through the hybrid shaft power conversion machine 44) or a negative command (absorb torque from the engine 40 and generate electricity to add to the hybrid energy storage device 46).

The preferred torque to be generated or absorbed by the hybrid shaft power conversion machine 44 is provided in the desired hybrid torque signal. In one embodiment the desired hybrid torque signal is within the inclusive range of the maximum and minimum hybrid torque available. The maximum torque generation is expected to be greater than or equal to the minimum value. The hybrid powertrain controller 47 is configured to calculate these torque values based on the following system conditions, including but which are not limited to, the state of the hybrid energy storage device 46, temperatures of the hybrid power system 48, and other system conditions considered to increase the performance of the vehicle 1.

The engine control unit 50, in addition to the normal engine control calibration and calculated parameters, is configured to provide a maximum torque to be delivered to the powertrain 42 by the engine 40, and the hybrid shaft power conversion machine 44, which is known as a vehicle torque limit (t). In different embodiments, the vehicle torque limit (t) is maintained in the control unit 50 as a function of engine speed which is stored in a lookup table available in a memory or which is otherwise accessible by the control unit 50. In other embodiments, the vehicle torque limits, maximum and minimum, are calculated continuously from inputs provided to the control unit 50, such as engine speed, transmission gear conditions, vehicle operating conditions, and other parameters as desired. The maximum engine torque (t) is the instantaneous capability of the engine to generate torque based on an engine torque curve, and any other active limits, described later herein.

A supervisory controller 52, in different embodiments, is coupled to the hybrid powertrain controller 47 to provide a desired energy storage level control signal to the hybrid powertrain controller 47. The desired energy storage level signal provides a level of energy storage which determines the energy storage level which is to be maintained in the hybrid energy storage device 46. For instance, energy storage devices typically have an energy storage level which is recommended by the manufacturer. Consequently, the desired energy storage level signal is different depending on the recommended energy storage level of the storage device. In other embodiments, the desired energy storage level is determined based on desired operating parameters of the vehicle, and not only the desired energy storage level of the energy storage device.

FIGS. 3A, 3B, 3C and 3D are flow diagrams for a method to provide speed governing and torque control in a work vehicle having a hybrid power system. As described in the attached flow diagram and as embodied by the control system of FIG. 2, the present invention determines a torque to be delivered to or provided by the powertrain 42, wherein the torque is determined by the operating conditions or states of the engine and the hybrid power system 48. The method determines a preferred or optimum torque which is modified or which changes substantially continuously depending on the loads to the powertrain and the operating states of the engines 40 and the hybrid power system 48, wherein the preferred torque is a result of an arbitration between a number of potentially conflicting requirements between the required inputs to and desired outputs of the powertrain 42.

Each of the controllers 47 and 50 includes processors configured to operate according to software based routines which implement the embodiments of the invention, whether implemented as part of an operating system or a specific application, component, program, object, module or sequence of instructions referred to herein as "computer program code", or simply "program code". The computer program code typically comprises one or more instructions that are resident at various times in various memory and storage devices in a computer, and that, when read and executed by one or more processors in the controllers, causes those controllers to perform the steps necessary to execute the method or methods of FIG. 3. Moreover, while the invention is described in the context of controllers, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, it should be appreciated that the method or methods described herein are implementable in various program code and should not be limited to specific types of program code or specific organizations of such program code. Additionally, in view of the typically endless number of manners in which computer programs may be organized into routines, procedures, methods, modules, objects, and the like, as well as the various manners in which program functionality may be allocated among various software layers that are resident within a controller or computer if used, (e.g., operating systems, libraries, APIs, applications, applets, etc.), it should be appreciated that the invention is not limited to a specific organization.

Figure 3A:
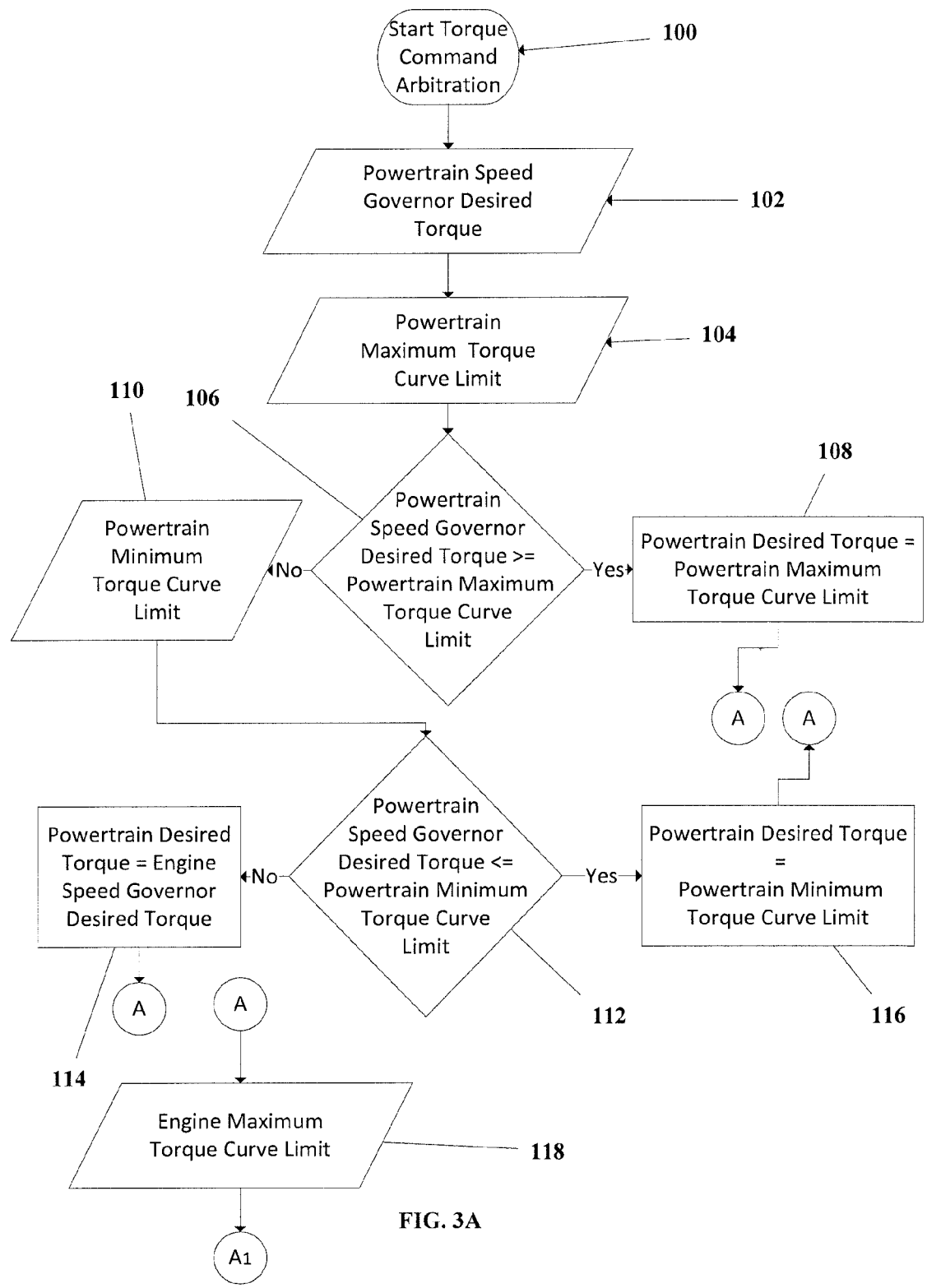
FIGS. 3A, 3B, 3C and 3D are flow diagrams for a method to provide speed governing and torque control in a work vehicle having a hybrid power system.

As seen in FIG. 3A, a torque command at the powertrain I/O 49 is determined (block 100). The torque at the powertrain I/O 49 is either a torque provided to the powertrain 42 by the engine 40 and by the hybrid shaft power conversion machine 44 or a torque generated by the powertrain 42 and provided to the engine 40 and to the hybrid shaft power conversion machine 44. To determine the torque at the powertrain I/O 49, the engine control unit 50 determines how much torque is to be supplied by the hybrid power system 48, which is transmitted as a hybrid torque command signal from the engine control unit 50 to the hybrid powertrain controller 47, which is based on 1) an overall desired torque and 2) an engine desired torque.

Using the torque command determined at block 100, a powertrain speed governor desired torque is determined at block 102. Once determined, a powertrain maximum torque curve limit is determined at block 104. The powertrain maximum torque curve limit is a torque limit which is illustrated, for one embodiment, in FIG. 4. The powertrain maximum torque curve limit is the maximum torque allowed by the vehicle, typically given as a function of speed. As an example, in a non-hybrid system, a maximum combined torque limit would be limited by the engine torque curve. In the present embodiments, however, the powertrain maximum torque curve limit is determined by the desired performance of the powertrain, the capabilities of powertrain components, or the sum of an engine torque curve and the maximum capability of the hybrid drive system, whichever is lower.

Figure 4:
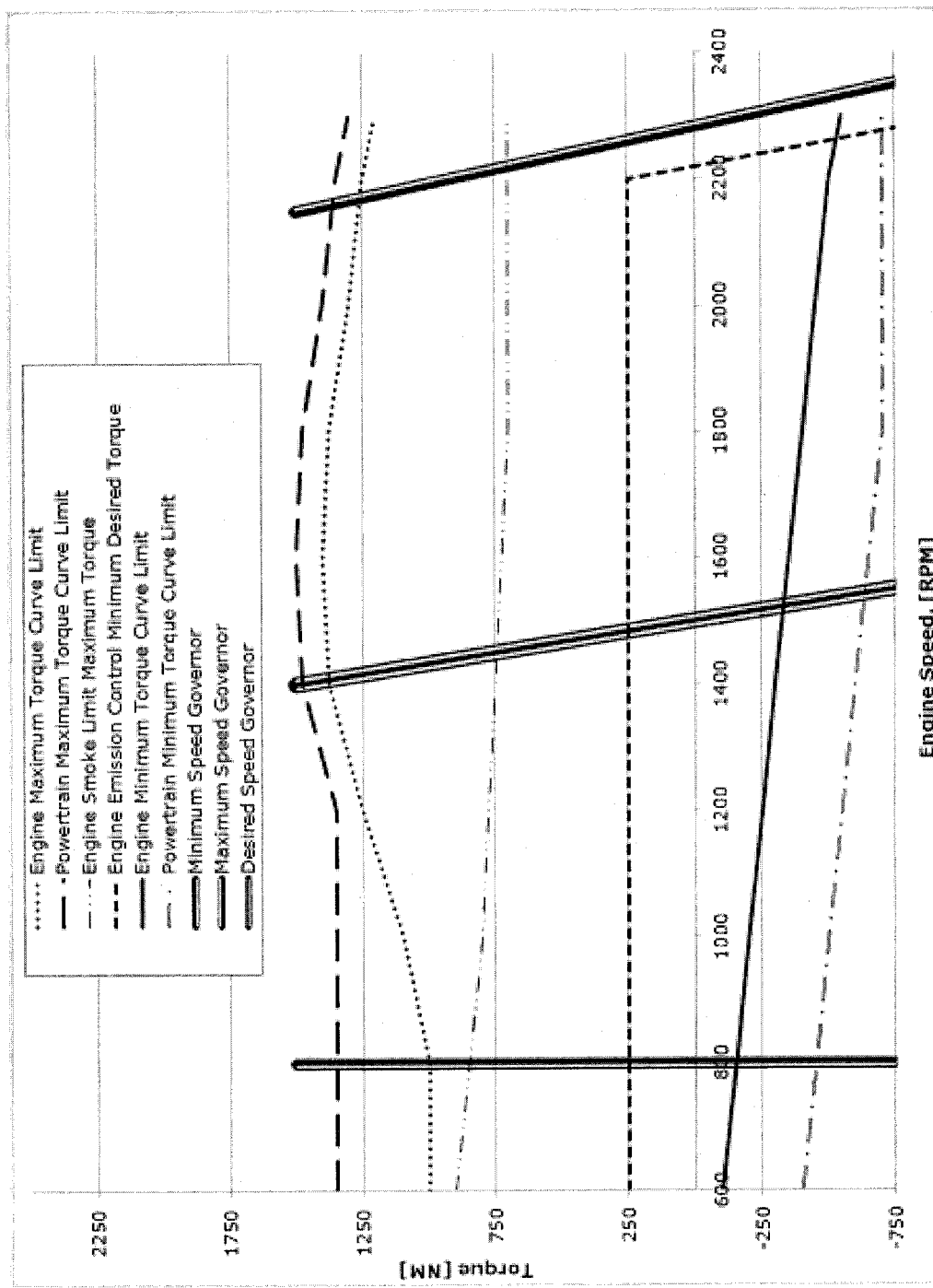
FIG. 4 is a graphical representation of a system operating envelope depicting torque versus engine speeds.

As illustrated in FIG. 4, for one embodiment of a vehicle powertrain including an engine and a hybrid power system, the powertrain maximum torque curve limit and the engine maximum torque curve limit are shown where the powertrain maximum torque curve limit is greater.

At block 106, the value of the powertrain speed governor desired torque is compared to the powertrain maximum torque curve limit. If this value is greater than or equal to the powertrain maximum torque curve limit, then a powertrain desired torque is set equal to the powertrain maximum torque curve limit at block 108. If this value is not greater than or not equal to the powertrain maximum torque curve limit, then at block 110 a powertrain minimum torque curve limit is determined, which is shown in FIG. 4 for engine revolutions per minute. The powertrain minimum torque curve limit is determined by the desired braking performance, limits of the powertrain components, or the sum of the maximum braking torque of both the engine and the hybrid system, whichever is greatest.

Once the powertrain minimum torque curve limit is determined, the powertrain speed governor desired torque is compared to the powertrain minimum torque curve limit at block 112. If the result is not less than or equal to the powertrain minimum torque curve limit, then the powertrain desired torque is set equal to an engine speed governor desired torque at block 114. If the result is greater than the powertrain minimum torque curve limit, then the powertrain desired torque is set equal to the powertrain minimum torque curve limit at block 116.

Figure 3B:
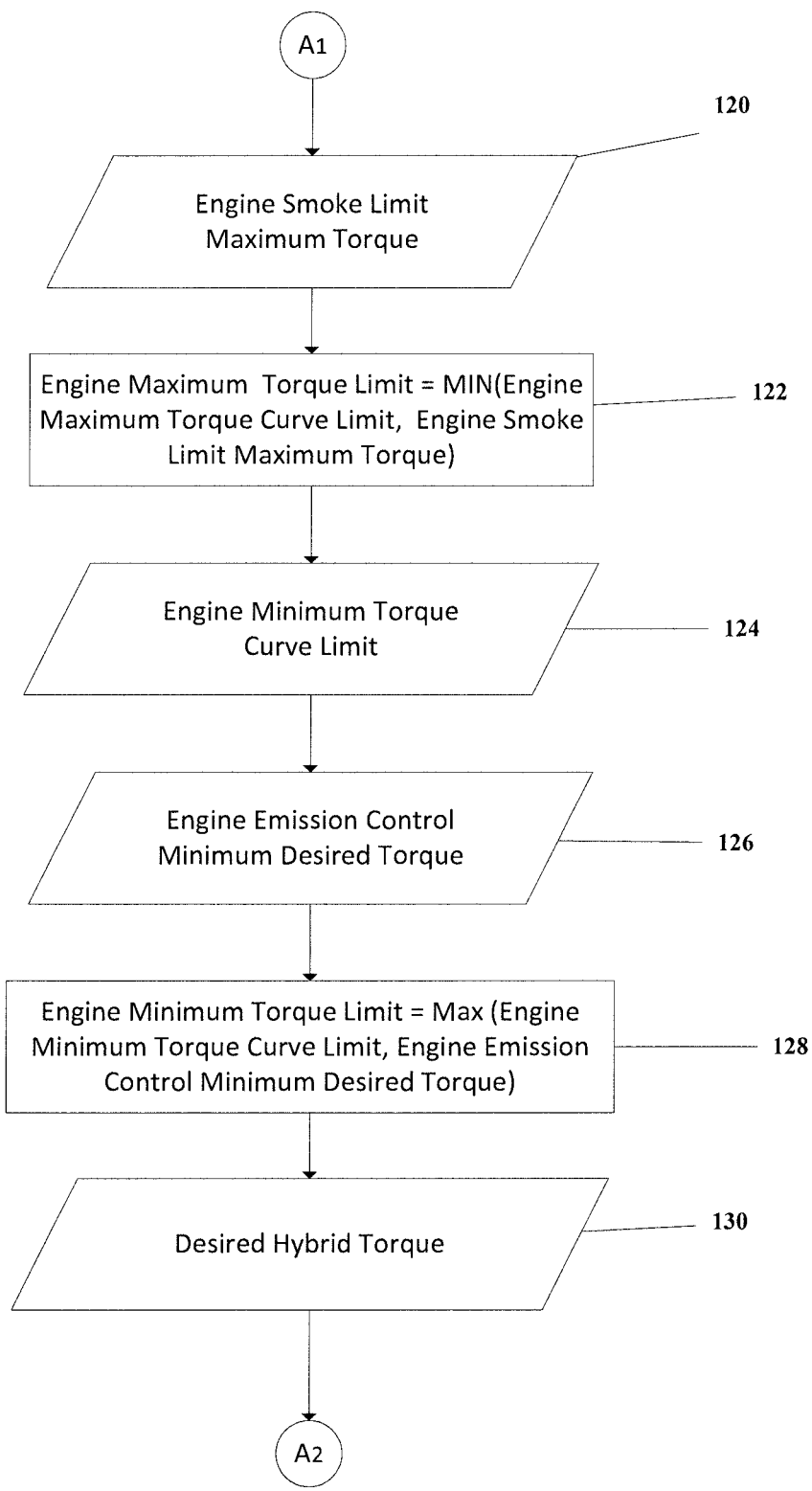
Figure 3C:
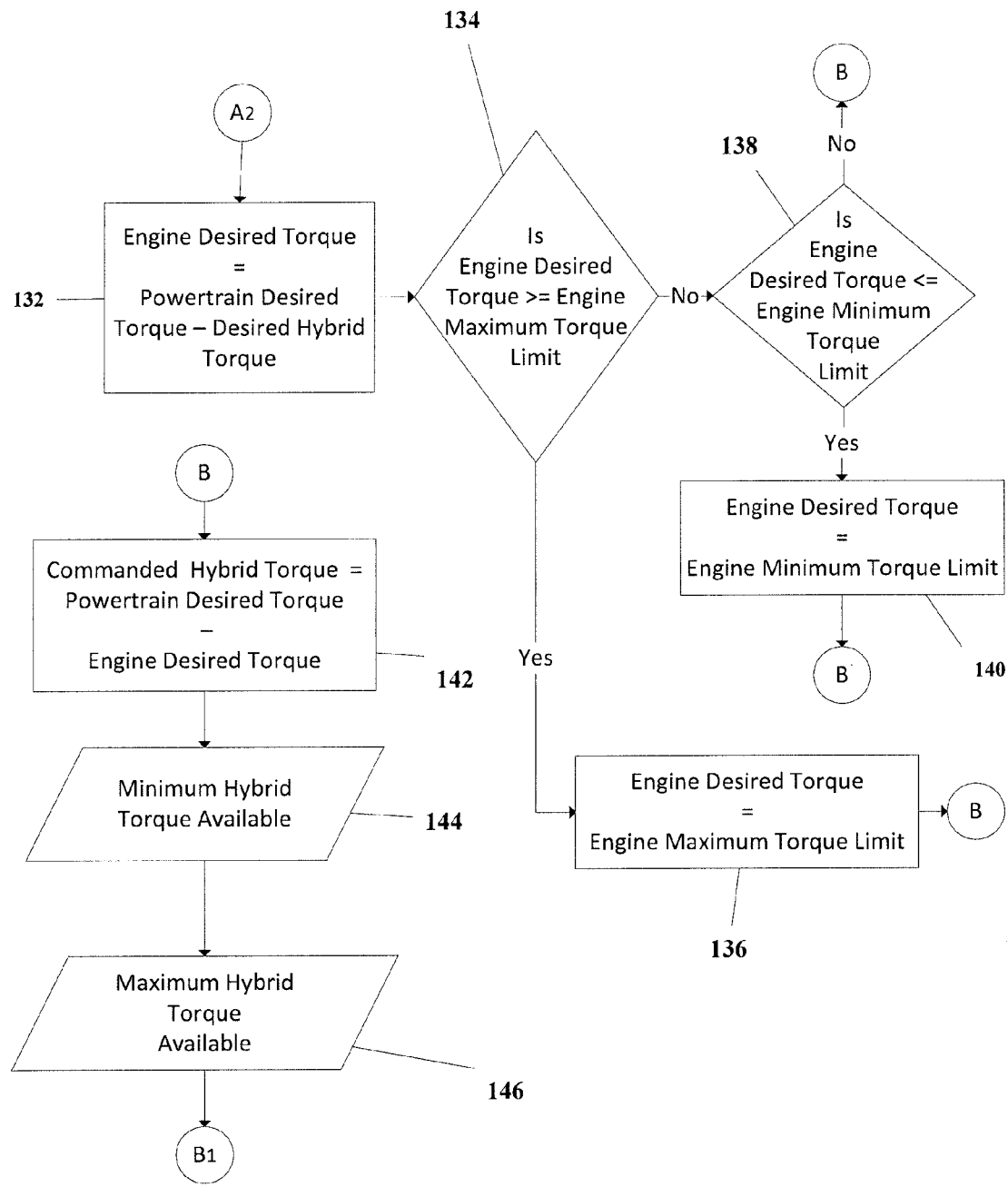

After establishing the powertrain desired torque, the engine control unit 40 determines an engine maximum torque curve limit at block 118 and an engine smoke limit maximum torque at block 120 (see FIG. 3B). The engine maximum torque curve limit is selected by accessing a lookup table stored in memory, having data corresponding to those limits as seen in FIG. 4. The lookup table includes values of the engine torque limit as a function of speed. The engine smoke limit maximum torque is a dynamically calculated value which is based on the amount of air which is flowing through the engine during transient conditions. At steady state, the engine smoke limit maximum torque is generally always greater than the engine torque curve in a properly operating engine. Once these two values have been determined, an engine maximum torque limit is set equal to the minimum of the engine maximum torque curve limit and the engine smoke limit maximum torque at block 122. This value is stored in memory and used to determine the engine desired torque, as described later.

Once the engine maximum torque limit is determined, an engine minimum torque curve limit is determined starting at block 124, in one embodiment, based on the data represented in FIG. 4. In addition, an engine emission control minimum desired torque is determined at block 126 which, in one embodiment, is based on the data represented in FIG. 4. Once both values are determined, the engine minimum torque limit is determined at block 128, where the engine minimum torque limit is set equal to the maximum of the engine minimum torque curve limit and the engine emission control minimum desired torque. This value is stored in memory and used to determine the engine desired torque, as described later.

At block 130 the desired hybrid torque is determined. The desired hybrid torque is calculated in the hybrid powertrain controller 47 as a function of the operating conditions of the hybrid power system 48, including the storage levels in the hybrid energy storage device 46, and a desired energy storage level. The operating conditions, in different embodiments, include variables such as temperature, total energy of the hybrid energy storage device, and other known, determined, or sensed variables. Control of the desired hybrid torque is to maintain the storage level of the hybrid energy storage device 46 to a desired storage level, subject to the limits of the components of the electrical system.

The desired hybrid torque is used to determine an engine desired torque at block 132, where the desired hybrid torque is subtracted from the previously determined powertrain desired torque determined at blocks 114 and 116. At block 134, the engine desired torque is then compared to the determined engine maximum torque limit previously determined at block 122. If the engine desired torque is greater than or equal to the engine maximum torque limit, then the engine desired torque is set equal to the engine maximum torque limit at block 136. If, however, the engine desired torque is less than or equal to the engine minimum torque limit (block 138), then the engine desired torque is set equal to the engine minimum torque limit at block 140. After the engine desired torque is established, the value is stored in memory.

At block 142, a commanded hybrid torque value is determined as being equal to a powertrain desired torque minus an engine desired torque. The powertrain desired torque is the desired torque value for the complete powertrain. The engine desired torque is the calculated torque which the engine is requested to produce at the end of the algorithm such that the engine desired torque is also considered to be a commanded engine torque.

Once the commanded hybrid torque is determined, a minimum hybrid torque available is determined at block 144 and a maximum hybrid torque available is determined at block 146. The minimum and maximum hybrid torques available are determined according to one or more sensors associated with each of the hybrid power hybrid shaft power conversion machine 44 and the hybrid energy storage device 46, as would be understood by one skilled in the art. The hybrid powertrain controller 47 determines these values based on the capabilities of the hybrid power system 48, and the achievable power input and output for the hybrid energy storage device 46 according to the conditions that exist at the time of determination.

Figure 3D:
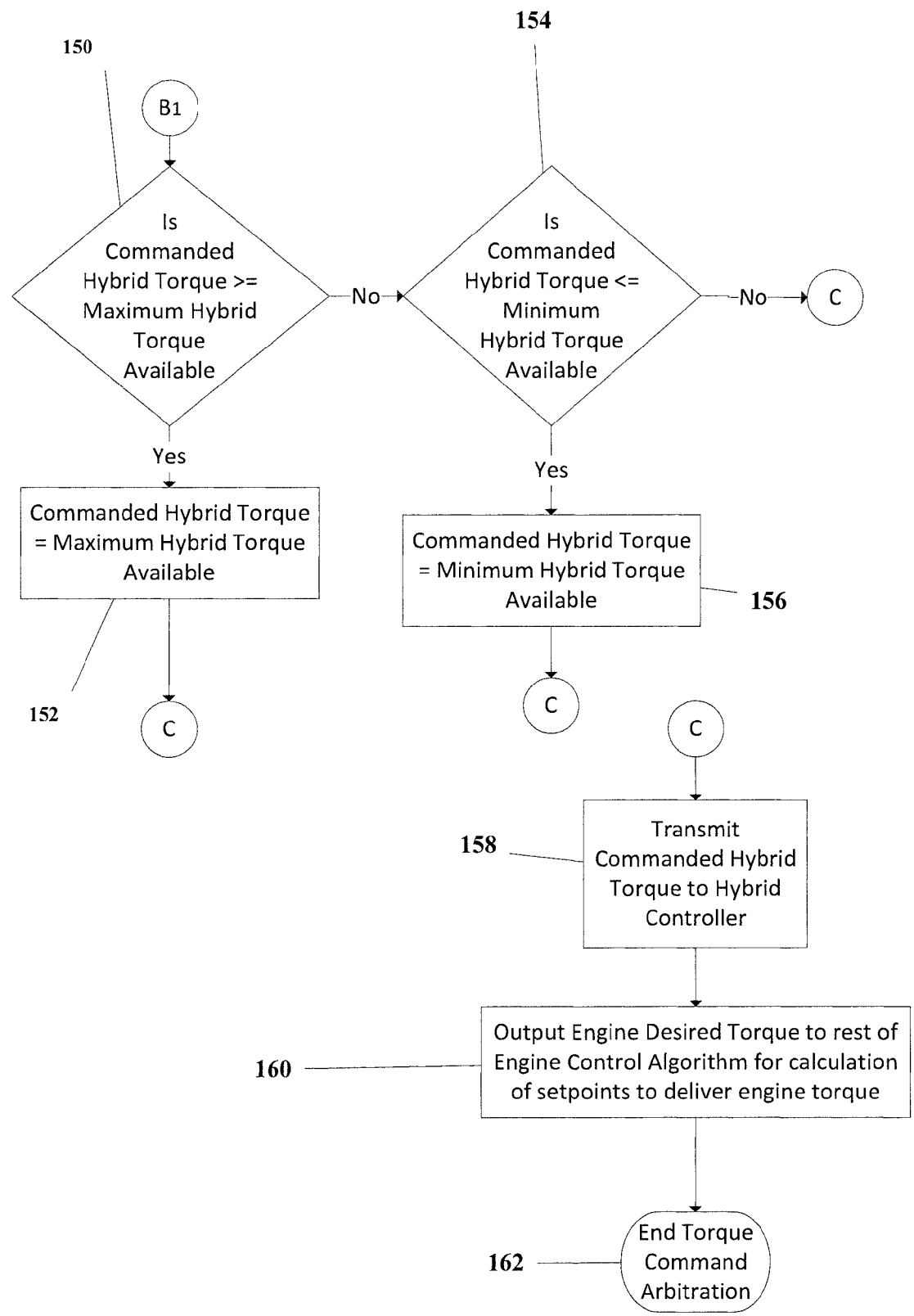

Each of these hybrid torques varies according to the energy level of the hybrid energy storage device 46, and once determined, the commanded hybrid torque is determined and compared to the maximum hybrid torque at block 150 (see FIG. 3D). If the commanded hybrid torque is greater than or equal to the maximum hybrid torque available, then the commanded hybrid torque is set equal to the maximum hybrid torque available at block 152. If the commanded hybrid torque is less than or equal to the minimum hybrid torque available (block 154) then the commanded hybrid torque is set equal to the minimum hybrid torque available at block 156. Consequently, the value of the commanded hybrid torque is one of the following three values: 1) the maximum hybrid torque available, 2) the minimum hybrid torque available, and 3) a value between the minimum and maximum hybrid torque available as determined at block 142.

Once the commanded hybrid torque is determined, the commanded hybrid torque is transmitted from the engine control unit 50 as the hybrid torque command signal and to the hybrid powertrain controller 47 of FIG. 2. (block 158). Once received by the hybrid powertrain controller 47, the engine desired torque signal, determined at blocks 136 and 140, is used at block 160 in an engine control algorithm to calculate the setpoints which establish the delivered engine torque. Once the engine desired torque is determined, the torque command arbitration is complete at block 162.

While exemplary embodiments incorporating the principles of the present invention have been disclosed hereinabove, the present invention is not limited to the disclosed embodiments. Instead, this application is intended to cover any variations, uses, or adaptations of the invention using its general principles. For instance, while the hybrid power train controller and engine control unit are illustrated as separate devices, in other embodiments the hybrid power train controller and energy control device are embodied as a single device. Likewise, in other embodiments all control functions of a vehicle including the speed controller are embodied as a single device. Further, this application is intended to cover such departures from the present disclosure as come within known or customary practice in the art to which this invention pertains.

What is claimed is:

1. A control system for a work vehicle hybrid power system to drive a powertrain, the hybrid power system including an internal combustion engine, a reversible shaft power conversion machine, and an energy storage device, the control system comprising:
   an engine controller, operatively coupled to the engine;
   a hybrid powertrain controller, operatively coupled to the engine controller and to the powertrain to control the reversible shaft power conversion machine and manage the energy storage level of the energy storage device;
   one or more sensors operatively coupled to the hybrid powertrain controller and the reversible shaft power conversion machine and the energy storage device, the hybrid powertrain controller configured to generate an available torque signal based on one or more signals from the one or more sensors and to generate a desired torque signal, both of which are received by the engine controller;
   wherein the engine controller generates a torque command signal configured to command the engine and the reversible shaft power conversion machine to operate at a commanded torque in response to the available torque signal and the desired torque signal from the hybrid powertrain controller.

2. The control system of claim 1 wherein the available torque signal from the hybrid powertrain controller includes a maximum torque available signal and a minimum torque available signal.

3. The control system of claim 2 wherein a bi-directional torque to be generated by the reversible shaft power conversion machine is configured to provide: (i) torque to the powertrain and (ii) to receive torque from the powertrain, in response to a generate/deliver hybrid torque command signal generated by the hybrid powertrain controller, the generate/deliver torque command signal being determined in response to the torque command signal.

4. The control system of claim 3 wherein the hybrid powertrain controller is configured to control energy flow between the reversible shaft power conversion machine and the energy storage device.

5. The control system of claim 4 wherein hybrid powertrain controller is configured to receive a desired energy storage level signal configured to establish a desired energy storage level of the energy storage device.

6. The control system of claim 5 wherein the torque command signal is determined according to (i) a minimum torque available based on an energy level of the energy storage device; (ii) a maximum torque available based on the energy level of the energy storage device; and (iii) a powertrain desired torque minus an engine desired torque.

7. The control system of claim 6 wherein the engine desired torque is determined according to at least one of an engine maximum torque limit and an engine minimum torque limit, each of which includes predetermined limits established by a torque curve corresponding to the torque characteristics of the engine.

8. The control system of claim 7 wherein the engine maximum torque limit is determined by an engine smoke limit torque.

9. The control system of claim 8 wherein the engine minimum torque limit is determined by a desired minimum torque for an emission control system.

10. A method of controlling an amount of torque being generated by an engine of a hybrid work vehicle including a reversible shaft power conversion machine, an energy storage device, a powertrain, and a powertrain speed governor, the method comprising:
   determining a power train speed governor desired torque;
   determining a desired torque to be provided by the reversible shaft power conversion machine;
   sensing an actual minimum torque available from one of the reversible shaft power conversion machine and the energy storage device;
   sensing an actual maximum torque available from one of the reversible shaft power conversion machine and the energy storage device; and
   generating a commanded torque signal as a function of the powertrain speed governor desired torque, the desired torque, the actual minimum torque available from one of the reversible shaft power conversion machine and the energy storage device, and the actual maximum torque available from one of the reversible shaft power conversion machine and the energy storage device.

11. The method of claim 10 wherein the commanded torque signal is generated as a function of a powertrain desired torque and an engine desired torque.

12. The method of claim 11 further comprising determining the engine desired torque as a function of an engine maximum torque limit and an engine minimum torque limit.

13. The method of claim 12 wherein the engine maximum torque limit is determined as a function of a maximum engine torque curve limit and an engine smoke limit torque.

14. The method of claim 13 wherein the engine minimum torque limit is determined as a function of minimum engine torque curve limit and a desired minimum torque for an emissions control system.

15. The method of claim 11 wherein the engine desired torque is determined as a function of the powertrain desired torque and the desired torque.

16. The method of claim 15 wherein the powertrain desired torque is determined as a function of a maximum combined torque limit, a minimum combined torque limit, and the powertrain speed governor desired torque.

17. The method of claim 16 wherein the maximum combined torque limit is determined as a function of at least one of a desired performance of the powertrain, capabilities of powertrain components, and a sum of an engine torque curve and a maximum capability of the reversible shaft power conversion machine.

18. The method of claim 17 wherein the minimum combined torque limit is determined as a function of a desired braking performance of the hybrid work vehicle, a limit of the powertrain components, and a sum of a maximum braking torque of both the engine and the reversible shaft power conversion machine.

19. The control system of claim 1 wherein the reversible shaft power conversion machine includes a first machine configured to convert shaft power into a power form to be stored in the energy storage device and a second machine configured to convert power stored in the energy storage device into shaft power.

* * * * *